March 9, 1965

R. H. BLACKMER 3,172,784

METHODS AND APPARATUS FOR REMOVING HEAT
AND WATER FROM A FUEL CELL

Filed Aug. 18, 1961

2 Sheets-Sheet 1

INVENTOR.
RICHARD H. BLACKMER
BY Lawrence G. Norris
ATTORNEY—

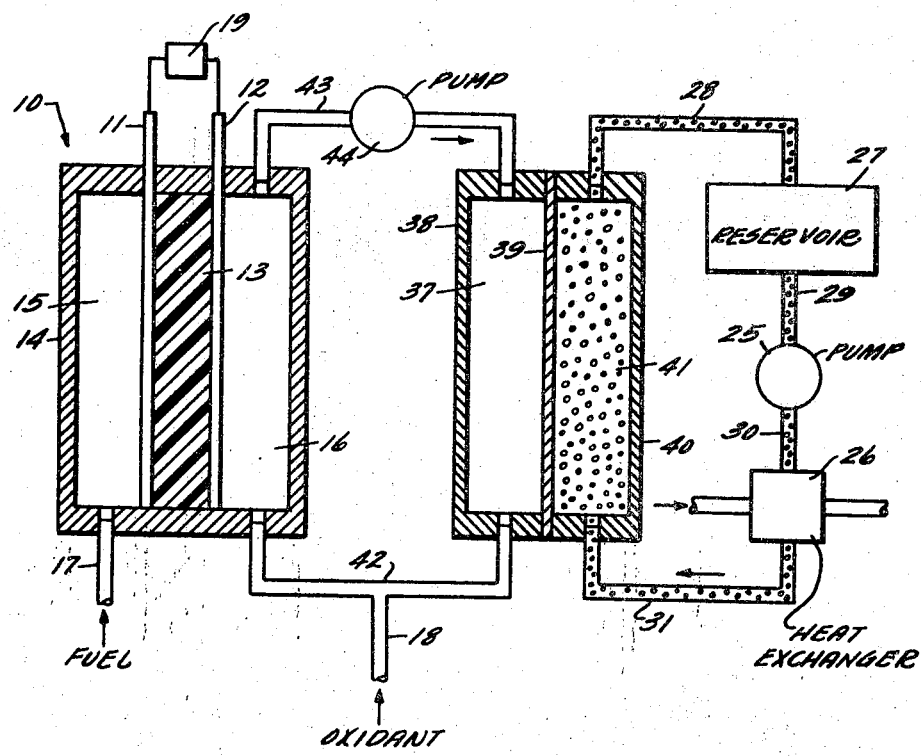

United States Patent Office 3,172,784
Patented Mar. 9, 1965

3,172,784
METHODS AND APPARATUS FOR REMOVING HEAT AND WATER FROM A FUEL CELL
Richard H. Blackmer, Topsfield, Mass., assignor to General Electric Company, a corporation of New York
Filed Aug. 18, 1961, Ser. No. 132,337
6 Claims. (Cl. 136—86)

My invention relates to the field of fuel cells and is directed in particular to an improved system and method for removing internally generated heat and water from fuel cells.

One of the problems connected with the operation of certain types of fuel cells is that of removing from the fuel cell the heat and water which are generated in the cell as a result of internal losses and the fuel-oxidant reaction. For example, considering by way of illustration the type of cell described and claimed in U.S. Patent 2,913,511, Grubb, assigned to the assignee of this application, it will be observed that where hydrogen and oxygen are used respectively as the fuel and oxidant and where the mobile ion is the hydrogen cation, water is formed on the cathode side of the cell as part of the fuel-oxidant reaction. In addition, heat is generated within the cell by internal losses in the cell.

The reaction water forms on the active surfaces of the cathode and membrane and unless drained off or otherwise removed begins to mask off substantial portions of the active surface area, thereby causing a deterioration in cell performance as operation continues. The problem of reaction water removal becomes more difficult in zero gravity environments where gravitational forces are not available to facilitate water drainage from the cell active surfaces and from the cell itself. Even where gravitational forces are present, the need for providing drainage in a variety of operating attitudes can cause complications in the drainage system.

Various other methods of water removal have been considered, one being, for example, the use of evaporation techniques. In the typical space application, however, where equippment weight and volume are at a premium, pure oxygen or some similarly concentrated oxidant other than air will generally be used, and the oxidant flow rates which may otherwise be desirable are generally insufficient to remove the water at the rate which it accumulates. In fact, in some cases, the oxidant side of the cell may be dead-ended, with oxidant flow through the cell taking place only intermittently during the purging operations.

Similar problems exist with respect to removing internally generated heat from the cell. In the fuel-air mode of operation additional cooling air may be circulated through the cell. In the typical space application, however, cooling air is not available and other means for removing heat from the cell must be devised. Even where cooling air is available, its utilization as a cell cooling medium may in some applications unduly complicate the cell system.

In view of the foregoing, it is an object of my invention to provide an improved method and apparatus for removing heat and water from a fuel cell.

It is another object of my invention to provide an imprived method and apparatus for removing heat and water from a fuel cell which does not depend for its operation on the existence of a gravitational field.

I accomplish these and other objects of my invention, in one embodiment thereof, by providing adjacent the side of the cell on which water is formed a semi-permeable or osmotic membrane exposed on one side to the cavity in the cell in which water is formed. I expose the other side of the osmotic membrane to a liquid solution selected to develop an osmotic pressure across the membrane.

In operation the cell will heat up to the point where the water formed on its active surfaces begins to evaporate and appear as water vapor in the cell cavity. The temperature of the liquid solution is maintained such that the surface temperature of the osmotic membrane is substantially lower than the operating temperature of the cell, such that the water vapor formed in the cell cavity condenses on the cooler surface of the osmotic membrane, giving up heat to the membrane in the process.

By reason of the osmotic pressure which is maintained across the membrane, the water condensing on the membrane surface is caused to pass through the membrane and into the liquid solution by osmosis. A portion of the heat, that which is given up to the membrane by condensation of the water vapor on its surface, is removed by conduction through the membrane and into the liquid solution and another portion of the heat is removed through absorption of the condensed water into the liquid solution.

As the reaction water is absorbed through the osmotic membrane into the liquid solution, the solution begins to heat up and become diluted as operation of the cell continues. In the typical installation it will therefore generally become necessary to provide means for removing the heat from the solution and also to add additional solute to the solution to maintain the desired strength. In one embodiment, I circulate the liquid solution through a heat exchanger to remove heat and I provide an accumulator for the solution which stores a sufficient volume of the solution such that the amount of dilution which occurs is within acceptable limits even for relatively long periods of operation. It will be appreciated, however, that once the heat and water are removed from the cell there are a number of acceptable ways of disposing of it and that any invention is not limited to any one particular method.

I have also devised alternative embodiments in which the osmotic membrane is located remotely from the cell cavity in which the water is generated. In one of these embodiments, I transport the condensed water from the cell cavity to the osmotic membrane by means of wicks. In another embodiment, I circulate the oxidant through the cell and then through a remotely positioned chamber which is exposed to an osmotic membrane. Water vapor is picked up in the cell by the circulating oxidant and carried to the remotely positioned chamber where it condenses on the membrane and is removed by the process of osmosis.

My invention will be better understood by reference to the following specification taken in connection with the accompanying drawing in which:

FIG. 1 shows an ion exchange membrane fuel cell having a heat and water removal system embodying my invention; and FIG. 2 illustrates an alternative embodiment of my invention in which the osmotic membrane is positioned remotely from the cell cavity in which the water is generated and in which the water is transported to the osmotic membrane by means of a wicking system; and FIG. 3 illustrates still another embodiment of my invention in which the oxidant is circulated through the cell to a remotely positioned chamber where the water vapor is condensed on the surface of an osmotic membrane and removed from the system by osmosis.

Referring now to FIG. 1, I have illustrated a fuel cell 10 o: a type described and claimed in United States Patent 2,913,511, Grubb, assigned to the assignee of the present application. I have illustrated my heat and water removal method and appratus as applied to that type of cell although it will be apparent from the description which follows that my invention may also be applied to other types of fuel cells.

The cell 10 comprises a pair of gas permeable electrodes 11 and 12 in direct contact with opposite surfaces of an ion exchange membrane 13. The electrode and membrane structures are supported in an outer casing 14 which forms fuel and oxidant cavities 15 and 16 respectively on opposite sides of the membrane 13. Fuel, which may for example be hydrogen, is introduced into the fuel cavity 15 through a suitable conduit 17 and the oxidant, which may for example be pure oxygen or any oxygen containing gas such as air, is introduced into the oxidant cavity 16 through a conduit 18.

In the case where hydrogen and oxygen are used respectively as the fuel and oxidant and the mobile ion is the hydrogen cation, the electrode 11 is the anode and the electrode 12 is the cathode terminal. In the operation of the cell electrons are caused to flow from the anode 11 to the cathode 12 through an external load 19, while hydrogen ions migrate from the anode 11 to the cathode 12 through the ion exchange membrane 13. Water is thus formed as the cathode 12 which must be removed from the system in order to prevent masking off or drowning of the active surfaces of the cathode 12 and the membrane 13. In addition, heat is generated within the cell by the chemical reaction and by the flow of ions through the internal resistance of the cell.

In accordance with my invention, I remove the heat and water generated in the operation of the cell in the manner now to be described.

Adjacent the cathode cavity 16 of the cell I place a semi-permeable or osmotic membrane 20 which is exposed along one of its major surfaces 21 to the cavity 16 in which water is generated. The opposing major surface 22 of the membrane is exposed to a chamber 23 which contains a liquid solution 24.

The composition of the solution 24 is selected to provide an osmotic pressure across the membrane 20 directed from the surface 21 and toward the surface 22. In certain tests which I have conducted, and which I will discuss later in detail, I have found that a solution of sugar and water performs very satisfactorily, although it will be apparent that other solutions may be used. The membrane 20 may be composed of any suitable semi-permeable or osmotic material such as goldbeater's skin, vegetable parchment, cellulose or the like, a wide variety of such materials being available and well known to the art.

To describe the operation of the system set forth thus far, assume that the cell 10 begins to operate, and that water begins to form on the cathode and membrane surfaces and that, at the same time, the temperature of the cell begins to rise because of internal heat generation. As the temperature of the cell rises beyond a certain point, the water formed in the membrane and cathode surfaces will begin to evaporate, absorbing heat in the process.

The temperature of the liquid solution 24 is maintained at a level sufficiently lower than the desired maximum operating temperature of the cell such that the water evaporating from the cathode side of the cell into the chamber 16 condenses on the cool surface 21 of the semi-permeable membrane 20, giving up heat to the membrane 20 in the process. It will be observed that in the sequence just described, the heat of condensation given up by the water vapor upon condensation on the membrane surface 21 is conducted through the membrane and into the liquid solution 24. A portion of the heat generated is also removed in the form of heat stored in the condensed water which is absorbed through the membrane 20 and into the solution 24. Thus, it will be seen that both heat and water are removed from the cell in the process.

As heat is absorbed in the solution 24, its temperature begins to rise and it will therefore generally be found necessary to remove heat from the solution, either by circulation or some other means. In addition, the water which is absorbed in the solution 24 through the membrane 20 gradually dilutes the solution and sufficient volume of solution must therefore be provided such that its strength will not fall below some preselected level for the period of operation desired, or additional solute must be added.

In the embodiment of my invention shown in FIG. 1, I use a circulating system in order to remove heat from the solution 24 and also to provide enough additional volume of solution to prevent an undesirably high dilution rate. In the system shown, the solution 24 is circulated by means of a pump 25 through a heat exchanger 26 and a reservoir 27 interconnected by suitable conduit means 28, 29, 30 and 31. The heat exchanger 26 which I have illustrated is of the type in which heat is transferred to some other medium circulated through conduits 32 and 33, although it may be of any other type, such as, for example, one in which the heat is discharged from the system by radiation. The reservoir 27 provides enough additional fluid volume such that the typical rates of water absorption occurring in the operation of the cell do not result in an appreciable dilution rate of the solution.

In addition, the reservoir 27 is provided with enough unused capacity to accommodate the increase in volume resulting from the absorption of the generated water into the solution 24. Eventually, of course, unless additional solute is added or unless water is evaporated or otherwise removed from the system, the strength of the solution will fall below the level required to maintain the desired osmotic pressure across the membrane 20.

All of the above parameters must be selected and appropriately matched for the particular application to yield the results desired. I will now present representative data which I have accumulated by test and analytical means on these various parameters and their relationship to each other.

Consider, for example, an ion exchange membrane fuel cell operating at a relatively heavy current density of active surface area, say 600 milliamperes per square centimeter. Under typical conditions, this corresponds to a water generation rate of about 0.02 cubic centimeter per hour per square centimeter of surface area. By surface area, I mean the projected flat surface area of the exposed membrane and electrode structure. For example, a membrane and electrode structure having an exposed surface of dimensions 10 cm. long and 10 cm. wide would have an active surface area of 100 square centimeters under my definition.

I have found that using a 60% sugar solution in water, which is near saturation at room temperature, water can be drawn through a 0.0018 inch thick cellulose membrane at a rate of about 0.11 cubic centimeter per hour per square centimeter of exposed surface area, which is five and one-half times greater than the rate of water generation under the conditions mentioned above for a heavily loaded cell.

In another series of tests, I used goldbeater's skin as the osmotic membrane and was able to draw water through the membrane at a rate of about 0.1 cubic centimeter per hour per square centimeter of exposed surface with only a 20% sugar solution. Extrapolation of these test results would indicate that with a 60% sugar solution, a water flow rate of about 0.24 cubic centimeter per hour per square centimeter could be achieved, which is about twelve times the water generation rate for the heavily loaded cell depicted above.

My test results thus show that for the same exposed area 21 of the osmotic membrane 20 as the active surface area of the cathode side of the cell, the water generated by the cell at relatively high current densities in the area of about 60 milliamperes per square centimeter can be removed by osmosis with a sugar solution having a sugar concentration of slightly over six percent by weight of sugar. I have conducted tests on thin permeable membranes of vegetable parchment, goldbeater's skin, and cellulose, and I have found that the osmotic characteristics of all of these materials fall within acceptable limits for use in the arrangement of my invention described herein.

There is a wide variety of semi-permeable materials which produce osmotic pressures by what appears to be a varying combination of several of the hypothetical mechanisms which have been proposed. It appears, however, that the magnitude of the osmotic pressure developed across an osmotic membrane when a solution and solvent are separated by the membrane is independent of the nature of the membrane. For dilute solutions the osmotic pressure is related to the temperature and concentration by the following expression:

$$P = \frac{g}{m} \frac{RT}{V}$$

Where P is the osmotic pressure, V is the volume of solution and g is the weight of solute having a molecular weight m. The constant R is for all practical purposes equal to the universal gas constant $$\left(0.73 \frac{\text{atmosphere ft.}^3}{\text{mole °R.}}\right)$$

For example, if ten pounds of sugar with molecular weight 342 is dissolved in 1.0 cubic foot of solution at 70° F. the osmotic pressure will be:

$$P = \frac{10(0.73)(530)}{342(1.0)} = 11.3 \text{ atmospheres}$$

Some other possible membrane materials which I have considered but not as yet tested are copper ferrocyanide and sheepskin. Solutes other than sugar which might be considered are glycerin, gum arabic, carbolic acid, potassium carbonate, potassium ferrocyanide, potassium nitrate, and sodium citrate. It will be appreciated that certain combinations of osmotic membranes and solutions will provide characteristics particularly suitable for specific applications. For example, for a very low temperature application, it would be desirable to select a membrane-solution combination that would either have a low freezing point or would be compatible with anti-freeze additives.

In the arrangement shown in FIG. 1, I have illustrated an embodiment of my invention in which the liquid solution 24 is circulated through a system by means of a pump 25. Because forced circulation is used the system is therefore independent of the direction or existence or non-existence of a gravitational field. The system illustrated can therefore operate in any gravitational environment, including zero gravity, to remove both heat and water internally generated within the cell.

In FIGS. 2 and 3, I show alternative configurations in which the osmotic membrane arrangement is located remotely from the cell cavity in which the water is generated.

In the arrangement shown in FIG. 2, the construction of the cell 10 is the same as that illustrated in FIG. 1 and I have used like numerals to designate like elements. In this embodiment, I utilize a wicking system to transport the condensed water vapor from the cell cavity 16 to an osmotic membrane 32 which is positioned adjacent a cavity 33 containing a liquid solution 34 such as a sugar solution or the like for developing an osmotic pressure across the membrane.

The wicking system comprises a network of wicks 35 which are distributed in a suitable pattern in the cell cavity 16 and which may be combined with strips or pads 36 of absorbent material to assist in picking up the condensed water vapor and introducing it into the wicking system. Once introduced into the wicks 35, the water is carried to the surface of the osmotic membrane 32 exposed to the wicks where it is removed from the system and taken into the solution 34 by the process of osmosis. Because the system of FIG. 2 relies on the pressure generated across the osmotic membrane to pump the product water from the cell system, its operation is independent of the direction or existence of a gravitational field.

The solution 34 may be circulated in the manner shown in FIG. 1 or sufficient capacity may be provided to maintain the dilution and temperature rise which occur within tolerable limits.

In the configuration shown in FIG. 2, substantially less of the heat generated will be removed through the osmotic membrane because the heat of condensation given up when the water vapor condenses is transmitted to the wicks and to the walls of the chamber 16, with relatively little heat being retained in the condensed liquid. In this configuration, therefore, I provide a metallic plate 14a, forming a part of the casing structure 14, to conduct heat to the outer limits of the cell structure where it may be further dissipated in any convenient manner. In other words, in the configuration of FIG. 2, I use the osmotic membrane system primarily to remove water from the system, although a small amount of heat, that stored in the water, is removed through the membrane.

Referring now to FIG. 3, I show another embodiment of my invention in which the osmotic membrane system is located remotely from the cell chamber 16 in which water is generated. Here again, the cell 10 is of the same type as that illustrated in FIG. 1 and like numerals are used to designate like elements. In this embodiment, I circulate the gaseous oxidant through the cell cavity 16, where water is generated, and then through a remotely positioned cavity 37 formed in a casing 38 which also supports an osmotic membrane 39. Also formed in the casing 38, and on the opposite side of the membrane 39, is a second chamber or cavity 40, which is filled with a liquid solution 41, such as a sugar-water solution, for generating an osmotic pressure across the membrane.

The oxidant is introduced to the cell system through an inlet conduit in make-up quantities sufficient to allow circulation of a limited amount of oxidant continuously through the system formed by conduits 42, 43 and cavities 16 and 37. The oxidant may be circulated in any convenient manner, such as by means of a pump 44.

In operation, the water vapor which forms in the cell cavity 16 in the manner already described is circulated along the excess gaseous oxidant through the conduit 43 and the pump 44 into the chamber 37, where it is brought into contact with the osmotic membrane 39. The temperature of the membrane is maintained at a sufficiently low level to cause condensation on the surface of the membrane, and the condensed water vapor is then removed from the system through the membrane 39 by osmotic transfusion.

The liquid solution 41 may be circulated in a manner such as illustrated in FIG. 1 and I have illustrated such a system, using like numerals to identify like elements.

It will be observed from the foregoing that I have provided a new and improved method and apparatus for removing generated heat and water from fuel cells which may be made independent of gravitational field effects. In addition, my invention allows the transfer of heat and water out of the system through a barrier which provides a physical separation between the fuel cell system and the system to which the heat and water are transferred.

Although my invention provides certain advantages in terms of its insensitivity to gravitational fields, it will be apparent that it is equally applicable to and will function equally well in systems in which the gravitational environment is conventional. It will also be apparent that once the heat and water generated within the cell system have been removed and deposited in the liquid solution, any suitable method may be utilized for further disposition of the generated heat and water. In other words, one of the primary functions of the apparatus and method of my invention is to provide a means for extracting heat and water from the cell system, and once this has been accomplished, any suitable method may be utilized for further disposition of the heat and water so removed.

The arrangement shown in FIG. 1 may also be utilized to humidify the chamber 16 when the cell is not in operation to prevent drying out of the ion exchange membrane 13. This effect is produced by means of evaporation backflow through the osmotic membrane 20 from the liquid solution 24 to maintain the chamber 16 saturated with water vapor.

It will be appreciated from the foregoing discussion that various modifications, substitutions and changes may be made in the embodiments of my invention presented herein, and that it may be applied to fuel cells other than the particular type shown, without departing from the true scope and spirit of my invention as I have defined it in the appended claims.

What I claim as new and desire to secure by Letters Patent of the United States is:

1. The method of removing heat and water from a fuel cell system comprising the steps of evaporating the product water formed in the cell, condensing the water vapor so formed and bringing it into contact with the surface of an osmotic membrane, and transporting the water through said membrane and out of said fuel cell system by the process of osmosis.

2. The method of removing heat and water from a fuel cell system comprising the steps of evaporating the product water formed in the cell, condensing the water vapor so formed and bringing it into contact with a first major surface of an osmotic membrane, exposing the opposite major surface of said osmotic membrane to a liquid solution to create an osmotic pressure across said membrane, and transporting the water through said membrane and into said liquid solution by osmosis.

3. A heat and water removal system for fuel cells comprising an osmotic membrane, means for condensing the water vapor which forms in the cell and bringing it into contact with a major surface of said membrane, and means for developing an osmotic pressure across said membrane to transport the water through said membrane and out of the fuel cell system.

4. A heat and water removal system for fuel cells comprising an osmotic membrane positioned with a first of its major surfaces exposed to the chamber in the fuel cell in which water is formed, and means for bringing a liquid solution into contact with the major surface of said membrane opposite said first major surface for developing across said membrane an osmotic pressure in a direction to cause osmotic flow of water out of said cell chamber.

5. A water removal system for fuel cells comprising an osmotic membrane, a system of wicks extending into the chamber in the cell where water is formed and positioned to absorb the water vapor which condenses in the cell, said system of wicks extending into contact with a first major surface of said osmotic membrane to transport the water condensing in the cell to said membrane, and means for developing an osmotic pressure across said osmotic membrane to transport the water from the system of wicks through said osmotic membrane.

6. A heat and water removal system for fuel cells comprising an osmotic membrane, means for circulating a gas through the cell chamber in which water is formed to pick up the water vapor formed in the cell, means for exposing the gas to a first major surface of said osmotic membrane after the gas has picked up water vapor in the cell whereby the water vapor is allowed to condense on the osmotic membrane, and means for developing an osmotic pressure across said osmotic membrane to transport the condensed water vapor through the membrane and out of the cell system.

References Cited by the Examiner

UNITED STATES PATENTS 2,901,524  8/59  Gorin ------------------ 136—86
2,913,511  11/59  Grubb ----------------- 136—86

JOHN H. MACK, *Primary Examiner.*

JOHN R. SPECK, *Examiner.*